(12) United States Patent
Wagner

(10) Patent No.: US 8,173,038 B2
(45) Date of Patent: May 8, 2012

(54) METHODS AND SYSTEMS FOR FORMING MICROSTRUCTURES IN GLASS SUBSTRATES

(75) Inventor: Robert Stephen Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 1018 days.

(21) Appl. No.: 12/148,479

(22) Filed: Apr. 18, 2008

(65) Prior Publication Data

US 2009/0261082 A1 Oct. 22, 2009

(51) Int. Cl.
*C03C 15/00* (2006.01)
*C03C 23/00* (2006.01)
*B41M 5/24* (2006.01)

(52) U.S. Cl. .................. 216/97; 216/11; 219/121.69

(58) Field of Classification Search .......... 219/121.68, 219/121.69; 65/61, 286; 216/11, 97
See application file for complete search history.

(56) References Cited

U.S. PATENT DOCUMENTS

| | | | | |
|---|---|---|---|---|
| 3,626,141 A | * | 12/1971 | Daly | 219/121.68 |
| 4,626,613 A | * | 12/1986 | Wenham et al. | 136/255 |
| 5,081,049 A | * | 1/1992 | Green et al. | 438/71 |
| 5,131,957 A | * | 7/1992 | Epstein et al. | 148/565 |
| 5,138,130 A | * | 8/1992 | Islam et al. | 219/121.6 |
| 5,164,324 A | * | 11/1992 | Russell et al. | 438/708 |
| 5,221,365 A | * | 6/1993 | Noguchi et al. | 136/258 |
| 5,731,047 A | * | 3/1998 | Noddin | 427/555 |
| 6,084,175 A | * | 7/2000 | Perry et al. | 136/256 |
| 6,090,100 A | * | 7/2000 | Hohla | 606/5 |
| 6,676,878 B2 | * | 1/2004 | O'Brien et al. | 264/400 |
| 6,720,519 B2 | * | 4/2004 | Liu et al. | 219/121.61 |
| 7,132,054 B1 | * | 11/2006 | Kravitz et al. | 216/11 |
| 7,259,354 B2 | * | 8/2007 | Pailthorp et al. | 219/121.72 |

FOREIGN PATENT DOCUMENTS

JP 2002-348147 12/2002

OTHER PUBLICATIONS

Yen, Meng-Hua, et al., "Rapid cell-patterning and microfluidic chip fabrication by crack-free $CO_2$ laser ablation on glass", Journal of Micromechanics and Microengineering, vol. 16, 2006, pp. 1143-1153.
Chen, Ying-Tung, et al., "Ablation of Transparent Materials Using Excimer Lasers for Photonic Applications", Optical Review, vol. 12, No. 6, 2005, pp. 427-441.
Ion, John C., "Laser Processing of Engineering Materials", copyright Elsevier B.V.; pp. 384-394.

* cited by examiner

*Primary Examiner* — Samuel M Heinrich
(74) *Attorney, Agent, or Firm* — Robert L. Carlson

(57) ABSTRACT

A method for forming microstructure cavities in a glass substrate includes directing a first laser pulse onto the glass substrate thereby forming a first microstructure cavity having a tapered configuration. The first laser pulse may have first spot area on the surface of the glass substrate. A second laser pulse having a second spot area on the surface of the glass substrate may be directed onto the glass substrate thereby forming a second microstructure cavity having a tapered configuration. The second spot area may be substantially the same as the first spot area and may overlap the first spot area such that a portion of the sidewall disposed between first microstructure cavity and the second microstructure cavity is ablated. After the portion of the sidewall is ablated, the diameter of each of the first and second microstructure cavities may be less than the diameter of the first spot area.

19 Claims, 7 Drawing Sheets

METHODS AND SYSTEMS FOR FORMING MICROSTRUCTURES IN GLASS SUBSTRATES

TECHNICAL FIELD

The present invention generally relates to systems and methods for forming structures in glass substrates and, more specifically, to laser systems and methods for using laser systems to form microstructures in glass substrates through laser ablation.

BACKGROUND

Glasses, such as high content silica glass and boro-silicate glass, have many properties of interest for chemical, pharmaceutical, optical and biological applications including chemical inertness, high temperature durability, optical transparency, controllable surface wetting properties and the like. Positive topographical features (e.g., pillars, columns, grids and the like) and negative topographical features (e.g., cavities, voids, grooves and the like) may be introduced into a glass substrate to make the glass substrate suitable for a particular application. Conventional machining and molding techniques are commonly used to introduce features on the order of 1 mm and greater into a glass substrate while photolithography and chemical etching are commonly used to introduce features smaller than 1 mm (i.e., microstructures) into a glass substrate. These glass microstructures have potential for application in, for example, micro-fluidics, hyperhydrophobic surfaces, micro-cavity arrays, micro-lens systems, life science cells, micro-reactor mixing designs.

However, the photolithography and chemical etching techniques used for producing microstructures in glass are difficult to apply compared to the more conventional machining and molding techniques. Further, processes such as photolithography may be expensive and time consuming and therefore are not economically viable for small manufacturing runs and rapid prototyping.

Accordingly, alternative methods for producing microstructures in glass that are suitable for small manufacturing runs and prototyping.

BRIEF SUMMARY OF THE INVENTION

According to one embodiment, a method for forming microstructures in a glass substrate by laser ablation may include directing a beam of a laser source onto a surface of the glass substrate and traversing the beam across the surface of the glass substrate such that a spot area of the beam forms a first pattern on the surface of the glass substrate and glass is ablated from the glass substrate along the first pattern. The method may also include directing a beam of a laser source onto a surface of the glass substrate and traversing the beam across the glass substrate such that the spot area of the beam forms at least one second pattern on the surface of the glass substrate. The second or subsequent pattern may overlap or intersect with the first pattern. Glass may be ablated from the surface of the glass substrate along the second or subsequent pattern thereby forming at least one microstructure on the glass substrate.

According to another embodiment, a method for forming microstructure cavities in a glass substrate includes directing a first laser pulse onto the glass substrate thereby forming a first microstructure cavity having a tapered configuration in the glass substrate. The first laser pulse may have first spot area where the laser pulse intersects with the surface of the glass substrate. A second laser pulse having a second spot area where the laser pulse intersects with the surface of the glass substrate may be directed onto the glass substrate thereby forming a second microstructure cavity having a tapered configuration in the glass substrate. The second spot area may be substantially the same as the first spot area. The second spot area may also overlap the first spot area such that a portion of the sidewall disposed between first microstructure cavity and the second microstructure cavity is ablated. After the portion of the sidewall is ablated, the diameter of the first microstructure cavity and the diameter of the second microstructure cavity may be less than the diameter of the first spot area, the second spot area or both.

Additional features and advantages of the invention will be set forth in the detailed description which follows and, in part, will be readily apparent to those skilled in the art from that description or recognized by practicing the invention as described herein, including the detailed description which follows, the claims, as well as the appended drawings. It is to be understood that both the foregoing general description and the following detailed description present embodiments of the invention and are intended to provide an overview or framework for understanding the nature and character of the invention as it is claimed.

BRIEF DESCRIPTION OF THE DRAWINGS

The following detailed description of specific embodiments of the present invention can be understood when read in conjunction with the following drawings, where like structure is indicated with like reference numerals and in which.

DETAILED DESCRIPTION OF THE ILLUSTRATIVE EMBODIMENTS

Figure 1:
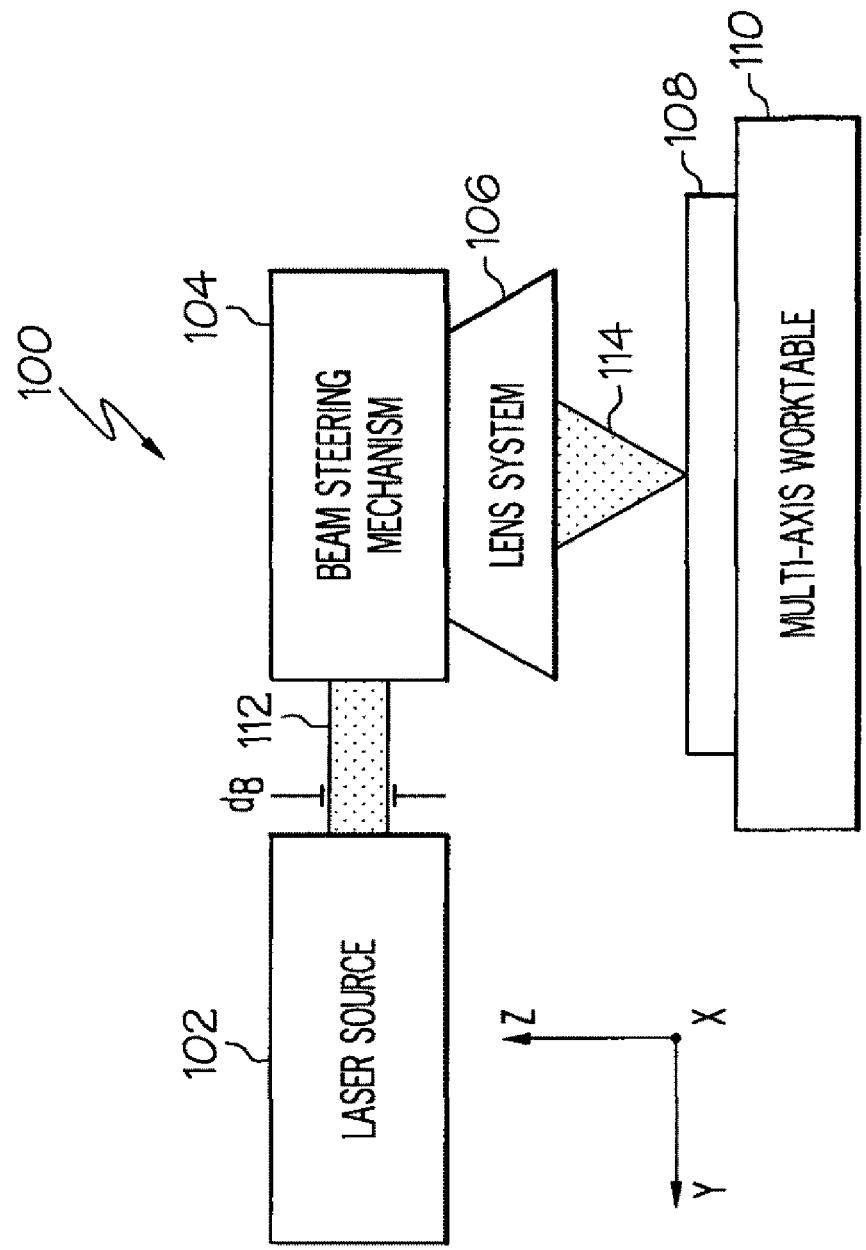
FIG. 1 is a block diagram generally showing the component of a laser ablation system used to form microstructures in glass substrates according to one embodiment shown and described herein.

Referring initially to FIG. 1, a laser system for forming microstructures in glass substrates is shown. The system may generally comprise a laser source, a beam steering mechanism for directing and scanning laser pulses of the laser source onto a glass substrate, a lens system for focusing the beam onto the glass substrate and a work table on which the glass substrate may be positioned. Each of the elements of the system as well as various methods for using the systems to form microstructures in a glass substrate will be discussed in more detail herein.

Referring now to FIG. 1, a laser system 100 for directing, focusing and scanning a beam 112 from a laser source 102 onto a glass substrate 108 is shown. The laser system 100 may generally comprise a laser source 102, a beam steering mechanism 104, and a lens system 106. In one embodiment, the laser system 100 may also comprise a multi-axis work table 110 on which a work piece (e.g., the glass substrate 108) may be positioned.

The laser source 102 may generally comprise a laser source having an output power sufficient to ablate glass from the surface of the glass substrate. As such, the laser source may generally comprise a Nd:YAG laser, a Nd:YVO$_4$ laser, a Nd:YLF laser, a CO$_2$ laser or the like. In one embodiment, the laser source 102 may generally be capable of being operated in a pulsed output mode such that the beam 112 of the laser source comprises discrete laser pulses. Preferably, the laser is pulsed below the rise time of the laser, to result in a short pulse time (e.g. less than 100 microseconds, more preferably less than 80 microseconds). In one particular embodiment, the laser source may comprise a CO$_2$ laser operated in a manner to produce a beam comprising a plurality of discrete laser pulses. For example, a typical pulse rise time for a CO$_2$ laser is on the order of 100 μs and, after the pulse reaches full power, the CO$_2$ laser is generally operated as a continuous wave output laser. However, by switching the laser off during the pulse rise time, the CO$_2$ laser may be operated in a pulsed mode. Accordingly, in one embodiment, the CO$_2$ laser is operated in pulsed mode by switching the laser on and switching the laser off during the pulse rise time such that laser pulses on the order of about 55 μs to about 80 μs are produced with each laser pulse having an energy of about 15 μJ to about 100 μJ, more preferably 20 μJ to about 80 μJ and most preferably about 25 μJ to about 40 μJ at the output of the laser source. The duration of each pulse may be varied to control the amount of material removed from the surface of the glass substrate by ablation. The beam 112 may generally have a diameter $d_B$ of approximately 2 mm at the output of the laser source 102.

In another embodiment the laser source 102 may generally be capable of being operated in a continuous wave output mode such that the beam 112 of the laser source comprises a continuous beam. For example, in one embodiment, the laser source may comprise a CO$_2$ laser operated in continuous wave mode. The output of the CO$_2$ laser may be regulated by pulse width modulation (PWM) to produce an average power output that is essentially continuous. Typical modulation frequencies to produce the continuous wave output of the CO$_2$ laser system are preferably from about 1 kHz to about 20 kHz with a period of about 1 ms to about 50 μs. Standard modulation frequencies for continuous wave operation are most preferably about 5 kHz with a period of about 200 μs.

Accordingly, it should now be understood that the methods and systems described herein may utilize a laser source operated in continuous wave mode or pulsed mode to form microstructures in the surface of the glass substrate.

The beam 112 of the laser source 102 is directed into the beam steering mechanism 104 where the beam 112 is redirected towards the glass substrate 108. The beam steering mechanism 104 may generally comprise at least one scanning mirror (not shown), such as a fast scanning mirror, which is used to redirect the beam 112 onto the surface of the glass substrate 108. In one embodiment, the beam steering mechanism 104 may comprise a pair of galvanometer mirrors. Each galvanometer mirror may be positioned to rotate about a different axis such that the beam may be scanned across the surface of the glass substrate 108 along 2 axes.

After the beam 112 is redirected by the beam steering mechanism 104, the beam 112 may pass through a lens system 106 which focuses the beam onto the surface of the glass substrate. For example, when the laser source is a CO$_2$ laser with an output beam diameter $d_B$ of 2 mm, the lens system 106 may be used to focus the beam such that the beam spot of the laser pulse 112 has a diameter $d_{SA}$ of 55 μm on the surface of the glass substrate. In another embodiment, the lens system 106 may comprise an F-theta lens as is commonly known in beam scanning applications. The F-theta lens may facilitate focusing the 2 mm diameter beam down to the 55 μm diameter spot area while also providing a flat field at the image plane (e.g., the surface 109 of the glass substrate 108) of the scan. In other words, for a specified working area, the beam output of the F-theta lens is substantially perpendicular to the surface of the glass substrate 108 for any position on the surface of the glass substrate within the working area. For example, in one embodiment, the F-theta lens may produce a 55 μm diameter spot area over a 25 mm×25 mm working area wherein the output of the F-theta lens is substantially perpendicular to the surface of the glass substrate.

The laser system 100 may also comprise a multi-axis work table 110. The multi-axis work table 110 may be used to position the glass substrate 108 during the laser ablation process. The multi-axis work table 110 may also be used to position the glass substrate 108 relative to the lens system 106 in the x-y plane and z directions. In one embodiment, when the lens system 106 comprises an F-theta lens with a reduced working area, the multi-axis work table 110 may be used to position the glass substrate relative to the F-theta lens effectively increasing the working area of the F-theta lens.

Accordingly, the beam steering mechanism 104 in combination with the lens system 106 may be used to focus and position beam 112 from the laser source 102 onto the surface of the glass substrate 108 at discrete positions. Moreover, because the output of the laser source 102 is of sufficient power to ablate glass from the surface of the glass substrate 108, the laser system 100 may be used to ablate glass from the glass substrate 108 thereby facilitating the introduction of various patterns in the surface of the glass substrate 108 via laser ablation thereby forming glass microstructures in the surface of the glass substrate 108.

Referring now to FIGS. 2-7, one embodiment of a method for forming microstructures in a glass substrate by laser ablation is shown. In this embodiment a laser system, such as the laser system 100 depicted in FIG. 1, may be used to direct a beam from the laser source onto the surface of a glass substrate such that the spot area of the beam forms a pattern on the surface of the glass substrate. The beam may be pulsed and the spot areas of each laser pulse in the pattern may overlap a spot area of a proceeding laser pulse, a spot area of a subsequent laser pulse or both thereby forming a plurality of microstructure cavities in a honeycomb pattern in the surface of the glass substrate. Using the method described herein, each microstructure cavity in the honeycomb pattern has a diameter smaller than the diameter of a spot area of the beam on the surface of the glass substrate.

Figure 2:
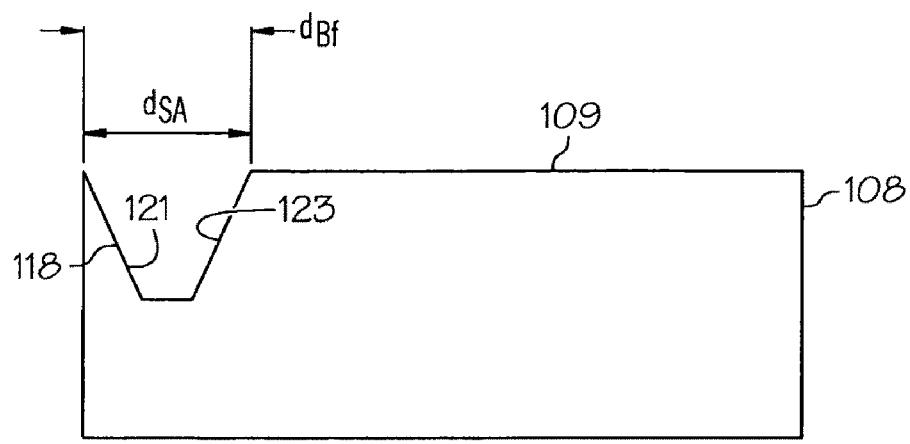
FIG. 2 depicts a cross section of a glass substrate having a tapered microstructure cavity formed by laser pulse incident on the surface of the glass substrate.

To form a microstructure cavity 118 in the surface 109 of the glass substrate 108 using a laser source operated in a pulsed mode, a first laser pulse may be directed onto the surface 109 of the glass substrate 108. The first laser pulse may be focused onto the surface 109 such that the first laser pulse has a first spot area 116 of diameter $d_{SA}$ on the surface 109 of the glass substrate. The diameter of the spot area 116 at the surface 109 of the glass substrate may be substantially smaller than the diameter $d_B$ of the laser pulse at output of the laser source 102 such that the laser pulse incident on the surface 109 of the glass substrate has sufficient energy density to exceed the ablation threshold for the glass substrate thereby ablating a first microstructure cavity 118 into the surface 109 of the glass substrate 108. This first microstructure cavity may have an initial diameter at the surface 109 of the glass substrate 108 substantially the same as the diameter $d_{SA}$ of the spot area 116 of the first laser pulse on the surface of the glass substrate 108. The first microstructure cavity 118 has sidewalls 121, 123 which as seen in FIG. 2 taper to a decreasing internal diameter with increasing depth below the surface 109 of the glass substrate 108 due to attenuation of the energy of the laser pulse during ablation.

A second laser pulse having a second spot area 120 is directed towards and focused onto the surface 109 of the glass substrate 108. The spot area 120 of the second laser pulse has a diameter $d_{SA}$ such that the spot area 120 of the second laser pulse is substantially the same as the spot area 116 of the first laser pulse. Using the beam steering mechanism 104 of the laser system 100 shown in FIG. 1, the second laser pulse may be directed onto the surface 109 of the glass substrate 108 such that the spot area 120 of the second laser pulse overlaps the spot area 116 of the first laser pulse thereby ablating a second microstructure cavity 124 having a tapered configuration into the surface 109 of the glass substrate 108. Because the spot area 120 of the second laser pulse overlaps the spot area 116 of the first laser pulse, a portion of the sidewall 127 between the first microstructure cavity and the second microstructure cavity is abated along with a corresponding portion of the surface 109 of the glass substrate. After the portion of the sidewall 127 is ablated, the diameter $d_{MS}$ of the opening in the first microstructure cavity is the same as the diameter $d_{MS}$ of the opening in the second microstructure cavity, both of which are less than the diameter $d_{SA}$ of the spot area of the first laser pulse or the second laser pulse on the surface 109 of the glass substrate. It should be understood that the diameter of the opening of a microstructure cavity refers to the diameter of the widest portion of the microstructure cavity. Because both the first and second microstructure cavities have a tapered configuration, the ablation of a portion of the sidewall 127 and a corresponding portion of the surface between the microstructure cavities results in microstructure cavities with opening diameters $d_{MS}$ which are less than the diameter $d_{SA}$ of the spot area incident on the original surface of the glass substrate. Accordingly, by overlapping the spot areas of adjacent laser pulses, microstructure cavities may be formed in the glass substrate via laser ablation such that the diameter of the opening of the microstructure cavity is smaller than the diameter of the laser pulse used to ablate the glass and form the microstructure cavity. For example, if the spot areas of the laser pulses are 55 μm on the surface of the glass substrate, the resulting microstructure cavities formed due to the overlap of spot areas will generally have an opening diameter $d_{MS}$ of less than about 50 μm, more preferably less than about 40 μm and most preferably less than about 30 μm. Accordingly, for a given diameter $d_{SA}$ of a spot area on the surface of the glass substrate, the resulting microstructure cavities will have an opening diameter of less than about the opening diameter of each microstructure cavity is less than about $0.90*d_{SA}$, more preferably less than about $0.7*d_{SA}$, and most preferably less than about $0.55*d_{SA}$.

While reference is made herein to directing a first laser pulse and a second laser pulse against the surface of the glass substrate 108 it should be understood that the first laser pulse and the second laser pulse may be directed towards the surface of the glass simultaneously, such as when multiple laser systems 100 are used to redirect a plurality of beam spots against the surface of the glass substrate 108.

Figure 3:
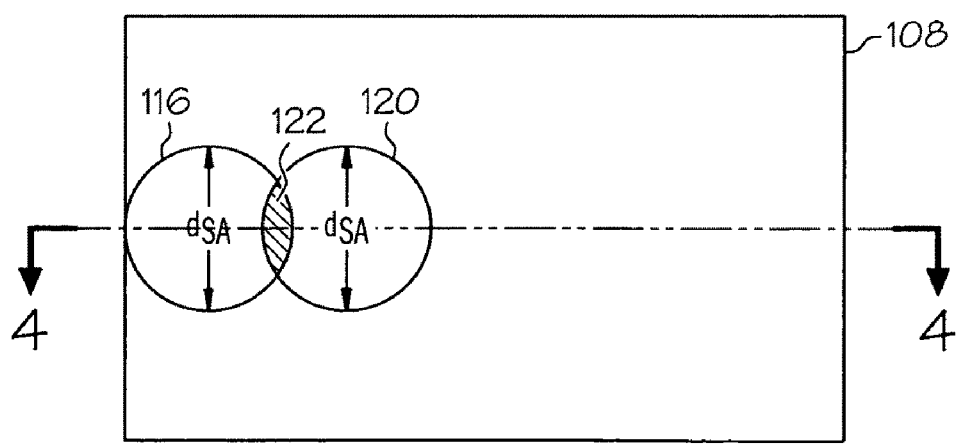
FIG. 3 depicts a top view of a glass substrate showing a first spot area of an first beam pulse incident on the surface of the glass substrate overlapped by a second spot area of a second beam pulse incident on the surface of the glass substrate according to one embodiment shown and described herein.
Figure 4:
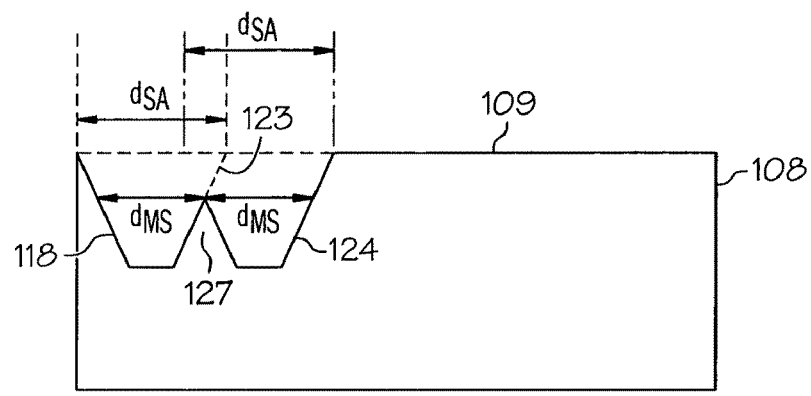
FIG. 4 depicts a cross section of the glass substrate shown in FIG. 3 showing a first microstructure cavity and a second microstructure cavity formed according to one method for forming microstructures in glass substrates shown and described herein.

Referring to FIG. 3, the opening diameters $d_{MS}$ of the first and second microstructure cavities may be controlled by adjusting the spacing between adjacent laser pulses and, therefore, the overlap 122 between adjacent spot areas. Accordingly, by increasing the overlap (or decreasing the spacing between spot areas of consecutive laser pulses), more of the sidewall between adjacent microstructures cavities is removed. Because the sidewalls between the cavities are tapered, removing more of the sidewall (or decreasing the height of the sidewall) reduces the diameter of the opening of the microstructure cavity. Accordingly, the opening diameter of the resulting microstructure cavities may be adjusted by adjusting the spacing between consecutive adjacent laser pulses such that adjacent spot areas overlap.

Figure 5:
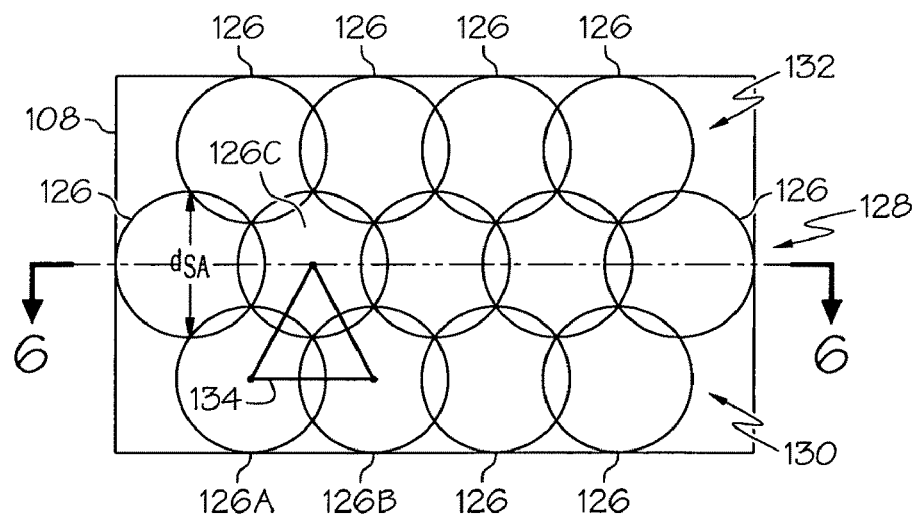
FIG. 5 depicts a pattern of spot areas from a plurality of beam pulses incident on the surface of a glass substrate for forming a honeycomb pattern of microstructure cavities according to one method for forming microstructures in glass substrates shown and described herein.
Figure 6:
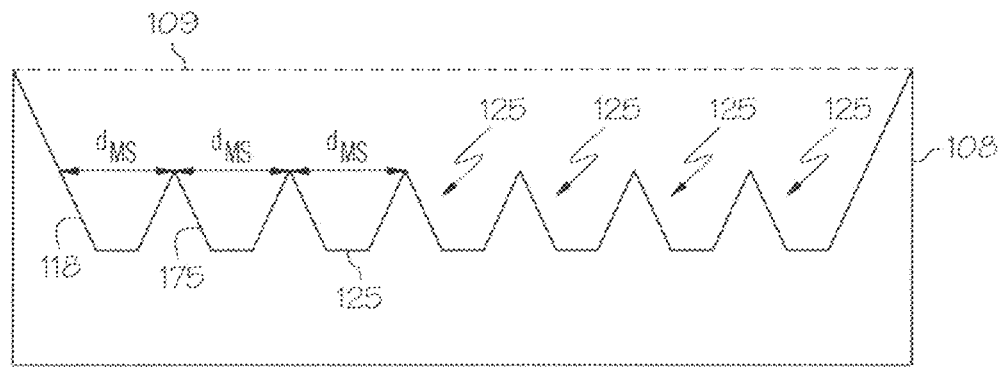
FIG. 6 depicts a cross section of the glass substrate of FIG. 5 having a plurality of microstructure cavities formed according to one method for forming microstructures in glass substrates shown and described herein.

The technique of overlapping the spot areas of laser pulses to create microstructure cavities in the surface of a glass substrate may be repeated multiple times to form a pattern of microstructure cavities in the surface 109 of a glass substrate 108 as shown in FIGS. 5-8. In one embodiment, a plurality of laser pulses may be directed and focused on to the surface 109 of the glass substrate 108 such that a spot area of each laser pulse overlaps a spot area of a preceding laser pulse, a spot area of a subsequent laser pulse or both. For example, as shown in FIGS. 5 and 6, a first plurality of laser pulses may be directed onto the surface 109 of the glass substrate 108 along a line such that the spot areas of the laser pulses form a first linear pattern 128 of overlapping spot areas 126 with each spot area 126 representing the formation of a microstructure cavity 125 in the glass substrate via laser ablation.

Figure 7:
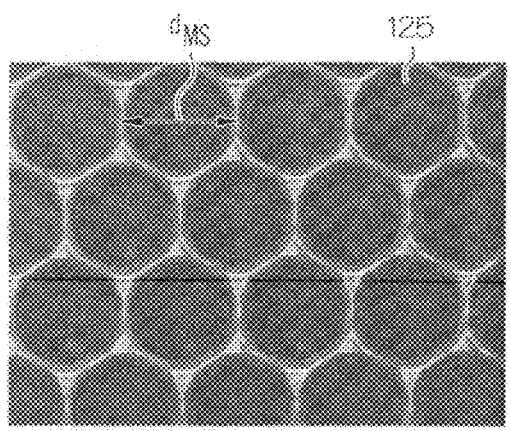
FIG. 7 shows a top view of a glass substrate having a honeycomb pattern of microstructure cavities formed according to one method for forming microstructures in glass substrates shown and described herein.

Thereafter, a second or subsequent plurality of laser pulses may be directed onto the surface 109 of the glass substrate 108 along a line such that the spot areas of the laser pulses form a second or subsequent linear pattern 130 of overlapping spot areas 126 with each spot area 126 representing the formation of another microstructure cavity 125 in the glass substrate through laser ablation. The second or subsequent linear pattern 130 may be generally parallel to the first linear pattern 128 and may generally overlap the first linear pattern 128 such that each spot area 126 overlaps every adjacent spot area 126 such that the microstructure cavities formed generally have diameters and pitch (distance between center point of the microstructure cavities) smaller than the diameters of the spot areas in the first linear pattern and the second or subsequent linear pattern 130. For example, for a 50 micron beam spot size, structures can be made whose center points are 20 microns apart. Thus, for example, structures can be achieved whose pitch (distance between centers) is less than the spot size of the laser, more preferably less than 0.75 times the spot size of the laser, and in some instances can be even less than 0.5 times the spot size of the laser. Further, the second or subsequent linear pattern 130 may be linearly offset from the first linear pattern 128 such that the center of each spot area 126 in the first linear pattern 128 may be disposed between the centers of two adjacent spot areas 126 in the second or subsequent linear pattern 130. More particularly, the first linear pattern 128 may be linearly offset from the second or subsequent linear pattern 130 such that the center points of any three mutually adjacent spot areas 126 (e.g., spot areas 126A, 126B, and 126C) form the vertices of an isosceles or equilateral triangle 134. Additional second or subsequent linear patterns 132 of overlapping spot areas 126 may be used thereafter to form a honeycomb pattern of microstructure cavities 125 in the surface 109 of the glass substrate 108 as shown in FIG. 7.

It should now be understood that microstructures, specifically microstructure cavities, may be formed in the glass substrate through laser ablation by directing a plurality of laser pulses onto the surface of a glass substrate such that the spot areas of the laser pulses form an overlapping pattern of spot areas and, because the spot areas of the laser pulses overlap, the opening diameters of the resulting microstructure cavities may be less than the diameter of the spot areas used to form the microstructure cavities.

Figure 8:
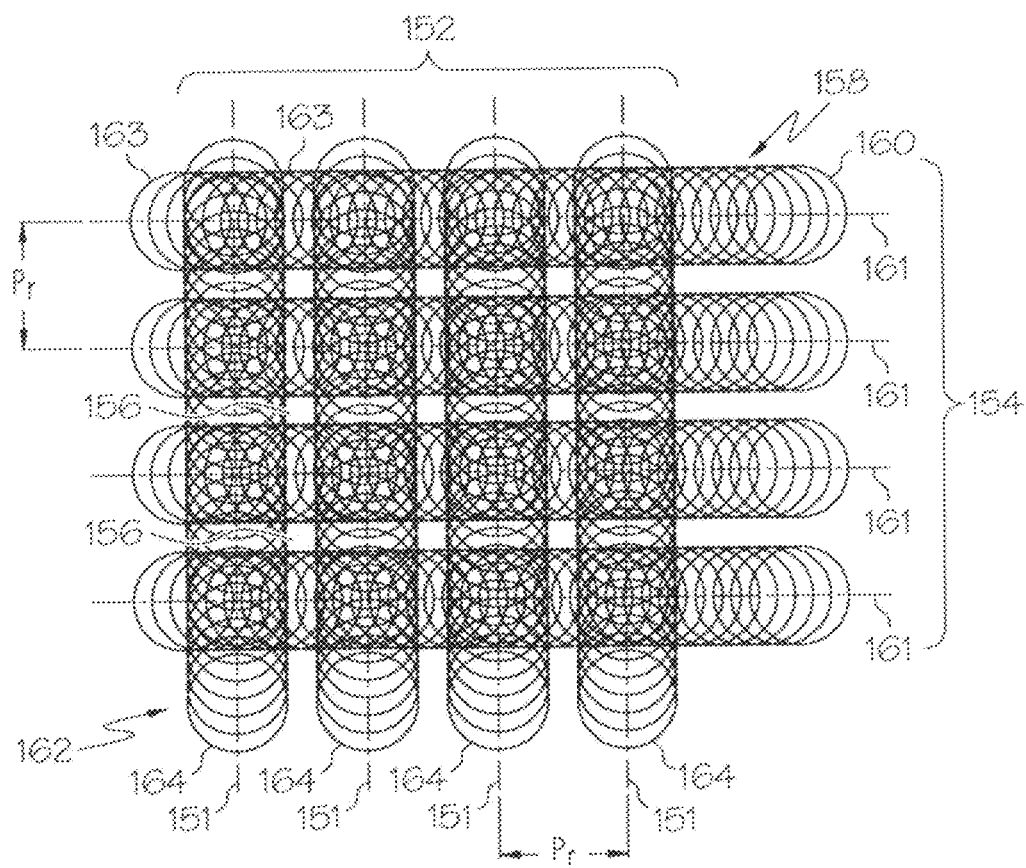
FIG. 8 depicts a pattern of sets of parallel lines scribed into the surface of a glass substrate to form square microstructure pillars according to one method for forming microstructures in glass substrates shown and described herein.
Figure 9:
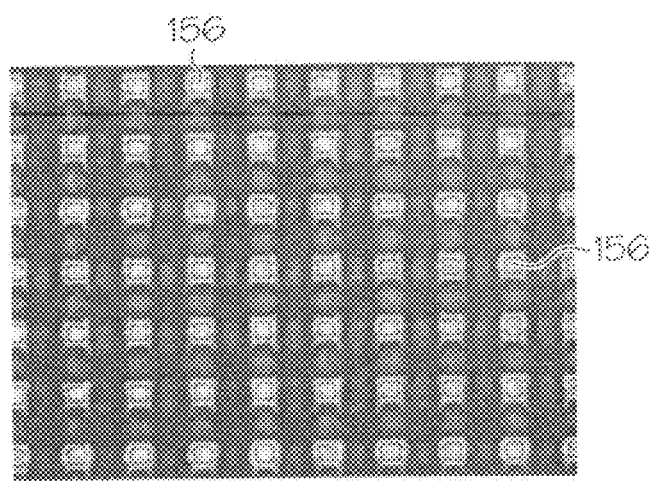
FIG. 9 shows a top view of a glass substrate having a regular pattern of square microstructure pillars formed according to one method for forming microstructures in glass substrates shown and described herein.

Referring now to FIGS. 8 and 9, another embodiment of a method for forming microstructures in a glass substrate by laser ablation is shown. In this embodiment, a laser system as depicted in FIG. 1 may be used to direct a beam onto the surface of the glass substrate along sets of parallel lines. The parallel lines are scribed into the glass substrate by using the laser system 100 to ablate glass along parallel lines. Therefore, by using the laser system 100 to scribe multiple sets of parallel lines having different relative orientations, a pattern of microstructures 156 may be formed in the glass substrate at the interstices between the intersections of different sets of parallel lines.

As shown in FIG. 8, in one embodiment, a first set of parallel lines 152 is scribed into the surface of the glass substrate by directing a plurality of laser pulses from a laser source operated in pulsed mode along multiple parallel lines 151 such that each line in the first set of parallel lines comprises a row of overlapping spot areas 162 and thereby ablating glass from the glass substrate along the parallel lines 151. The pitch $P_r$ of the parallel lines 151 may be selected and adjusted according to the desired dimensions of the resultant microstructures. The laser pulses (not shown) are centered on the parallel lines 151 such that each pulse of the plurality of laser pulses has as spot area 164 on the surface of the glass substrate that is centered on a parallel line 151. The spot area 164 of each laser pulse along a parallel line 151 may overlap a spot area of a preceding laser pulse, a spot area of a subsequent laser pulse or both such that a row of overlapping spot areas 162 may be defined by substantially parallel edges 163 tangential to each spot area 164 on either side of the row of overlapping spot areas 162. To reach this result, each spot area 164 may overlap a spot area of a preceding laser pulse, the spot area of a subsequent laser pulse or both by greater than about fifty percent of the diameter of a spot area.

After the first set of parallel lines 152 is scribed into the surface of the glass substrate, a second or subsequent set of parallel lines 154 may be scribed into the surface of the glass substrate in the same manner as the first set of parallel lines 152. In the embodiment shown in FIG. 8 the second or subsequent set of parallel lines 154 is scribed into the glass substrate by using the laser system to direct laser pulses along parallel lines 161 thereby scribing the second set of parallel lines 154 into the surface of the glass substrate. As shown in FIG. 8, the parallel lines 161 are oriented perpendicular to the parallel lines 151. Accordingly, the second set of parallel lines 154 scribed into the surface of the glass substrate are perpendicular to the first set of parallel lines 152. This results in the formation of a regular, repeating pattern of microstructure pillars 156 having square or rectangular cross sections at the interstices between the intersections of the first set of parallel lines 152 and the second set of parallel lines 154 as shown in both FIGS. 8 and 9. The pillar can have a top surface or height equal to the upper surface 109 of the glass substrate 108, or alternatively can be "submerged" below the surface 109.

As indicated herein above, the pitch $P_r$ of the parallel lines 151 and the pitch $P_r$ of the parallel lines 161 may be selected and adjusted to control the size and shape of the resulting microstructure pillars 156. For example, to produce square microstructure pillars, the pitch $P_r$ of the parallel lines 151 and the pitch $P_r$ of the parallel lines 161 may be selected to be the same. To produce rectangular microstructure pillars, the pitch $P_r$ of the parallel lines 151 and the pitch $P_r$ of the parallel lines 161 may be selected to be different. Further, the size of the resulting microstructures pillars 156 can be adjusted by increasing or decreasing the pitch of the parallel lines 151, 161. In one embodiment, the pitch of the parallel lines 151, 161 are selected such that the resulting microstructure pillars 156 have edge dimensions (e.g. length and width) smaller than the diameter of the spot area of the laser pulses used to form the microstructure pillars. For example, for a spot area of 55 μm, the pitch of the lines 151, 161 may be selected to be 75 μm such that the resulting microstructure pillars are 20 μm×20 μm square microstructure pillars. Accordingly, for a spot area having a diameter $d_{SA}$ on the surface of the glass substrate, the pitch of the lines 151, 161 may be selected such that an edge dimension of the microstructure pillar are less than about $0.75*d_{SA}$, more preferably less than about $0.5*d_{SA}$, and most preferably less than about $0.40*d_{SA}$.

Figure 10:
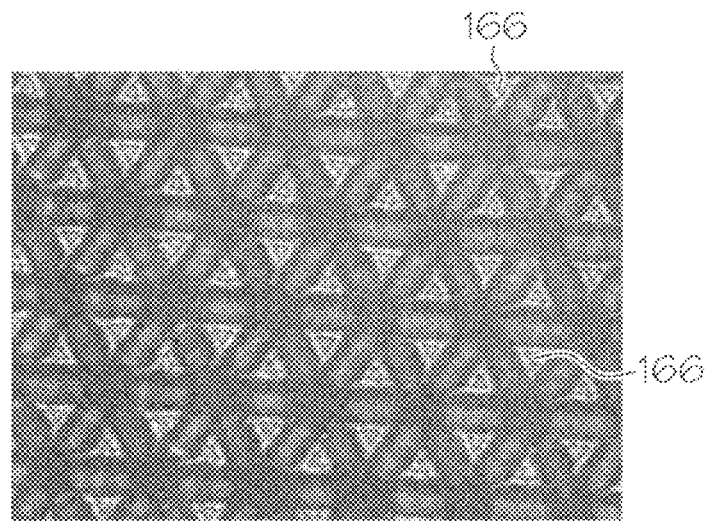
FIG. 10 shows a top view of a glass substrate having a regular pattern of triangular microstructure pillars formed according to one method for forming microstructures in glass substrates shown and described herein.

While FIGS. 8 and 9 shows ablating glass from a glass substrate along two sets of parallel lines having a 90 degree orientation with respect to one another to form square or rectangular microstructure pillars, it should now be understood that microstructure pillars having different shapes may be formed by ablating glass from a glass substrate along two or more sets of parallel lines with the sets of parallel lines having non-parallel orientations with respect to one another. For example, in one embodiment, diamond-shaped microstructure pillars may be formed at the interstices between intersections of two sets of parallel lines, each set of parallel lines having a 45 degree orientation with respect to the other set of parallel lines. In another embodiment, as shown in FIG. 10, triangular microstructure pillars may be formed at the interstices between intersections of three sets of parallel lines oriented at 60 degrees to one another. Accordingly, various shapes and patterns of microstructure pillars may be formed using various patterns of intersecting sets of parallel lines scribed into the surface of the glass substrate using the laser ablation techniques described herein.

Moreover, while specific reference has been made herein to scribing the first and second sets of parallel lines 152, 154 into the glass substrate by directing a plurality of laser pulses from a pulsed beam along parallel lines 151, 161, it should be understood that the first and second sets of parallel lines 152, 154 may also be scribed into the glass substrate by using the laser source 102 of the laser system 100 in a continuous wave output mode such that the output beam is continuous. For example, the first and second set of parallel lines 152, 154 may be scribed into the glass substrate by directing a continuous beam of the laser source onto the glass substrate and traversing the beam over the surface of the glass substrate along the parallel lines 151, 161 thereby ablating glass along the parallel lines 151, 161 and scribing the first and second sets of parallel lines into the glass substrate. The rows of overlapping spot areas shown in FIG. 8 generally indicate the pathways along which the continuous beam was traversed. The result is the formation of square or rectangular microstructure pillars at the interstices between the intersections of the first and second sets of parallel lines 152, 154. The edge dimensions (i.e., the length of the edges) of the resulting microstructure pillars may be controlled by adjusting the pitch $P_r$ of the parallel lines 151, 161.

Figure 11A:
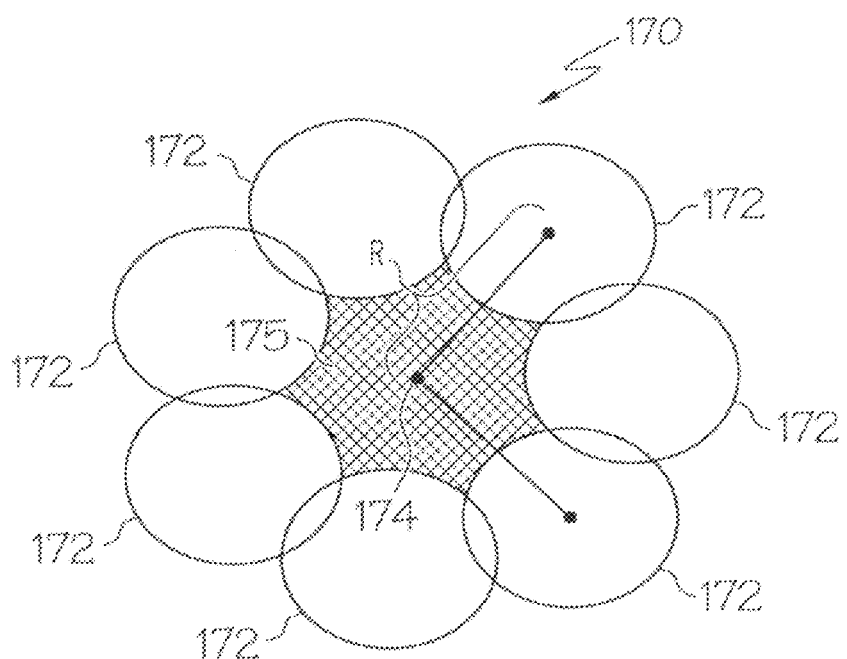
FIG. 11A depicts a first pattern of spot areas of laser pulses incident on the surface of a glass substrate to form a circular microstructure pillar according to one method for forming microstructures in glass substrates shown and described herein.
Figure 11B:
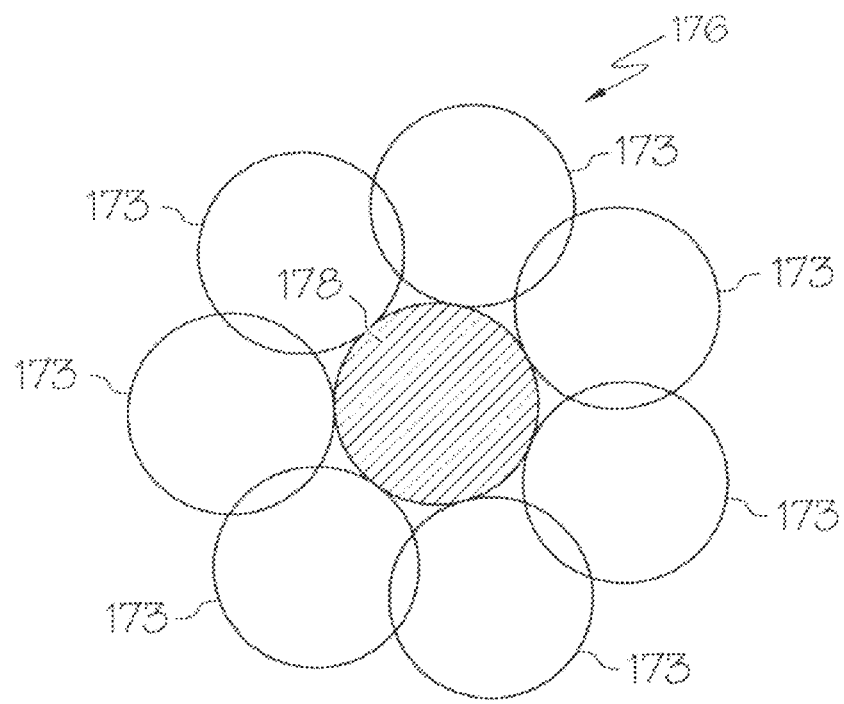
FIG. 11B depicts at least one second pattern of spot areas of laser pulses incident on the surface of a glass substrate to form a circular microstructure pillar according to one method for forming microstructures in glass substrates shown and described herein.
Figure 12:
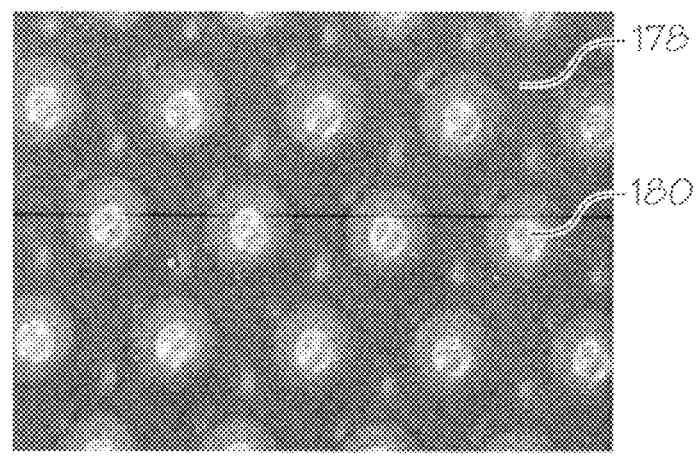
FIG. 12 shows a top view of a glass substrate having a regular pattern of circular microstructure pillars formed according to one method for forming microstructures in glass substrates shown and described herein.

Referring now to FIGS. 11A-12, another embodiment of a method for forming microstructures in a glass substrate is shown in which a beam from a laser source comprising a plurality of laser pulses is directed onto the surface of a glass substrate in radial patterns to ablate glass from the glass substrate at discrete positions along the radial pattern and thereby produce a circular microstructure pillar 178. Using the system depicted in FIG. 1 to control the position of laser pulses incident on the glass substrate, a first plurality of consecutive laser pulses are directed onto the surface of the glass substrate in a circular pattern such that the spot areas 172 of each laser pulse form a first radial pattern 170 having a radius R on the surface of the glass substrate. Each laser pulse is directed onto the surface of the glass substrate such that the center of each spot area 172 of each laser pulse is equidistant from the center point 174. Accordingly, the center of each spot area 172 lies along a circle of radius R centered on the center point 174. Further, the spot area of each laser pulse 172 overlaps a spot area of a preceding laser pulse, a spot area of a subsequent laser pulse or both. The size of the resulting microstructure 175 may be increased or decreased by increasing or decreasing the radius R of the first radial pattern and/or by decreasing the spacing between adjacent laser pulses (e.g., increasing the overlap between adjacent spot areas) and adding additional laser pulses to the first radial pattern 170.

As shown in FIG. 11A, the microstructure 175 remaining at the center of the first radial pattern 170 after glass is ablated from the glass substrate has an irregular, star-shaped configuration in cross section. To refine the microstructure 175 into a microstructure pillar having a circular cross section a second or subsequent plurality of laser pulses may be applied to the glass substrate in a second or subsequent radial pattern 176, such as that shown in FIG. 11B, thereby ablating glass from the glass substrate at discrete positions along the second or subsequent radial pattern 176. The second or subsequent radial pattern 176 may be centered about the same center point 174. In one embodiment, the center of each spot area 173 of each laser pulse in the second or subsequent radial pattern 176 may generally lay on the same circle of radius R such that each spot area 173 is equidistant from the center point 174, as with the first radial pattern 170. In another embodiment, the center of each spot area 173 of each laser pulse in the second or subsequent radial pattern 176 may lay on a circle having a radius less than the radius R of the first radial pattern. In either embodiment, the second or subsequent radial pattern 176 may be rotationally offset from first radial pattern such that portions of the glass substrate not ablated by the first plurality of laser pulses in the first radial pattern 170 are ablated by the second or subsequent plurality of laser pulses in the second or subsequent radial pattern 176 thereby refining the shape of the star-shaped microstructure 175 into a circular microstructure pillar 178 as shown in FIG. 11B. As with the first radial pattern 170, the spot area 173 of each laser pulse in the second or subsequent radial pattern 176 may overlap a spot area of a preceding laser pulse, a spot area of a subsequent laser pulse or both.

It should now be understood that a plurality of radial patterns of laser pulse spot areas may be applied to the glass substrate to refine the shape of the circular microstructure pillar 178. Moreover, it should be understood that, by using the method of applying multiple radial patterns of laser pulse spot areas, circular microstructure pillars of various cross sectional sizes may be created on the surface of the glass substrate. These methods may be repeated over the surface of the glass substrate such that a regular pattern of circular microstructure pillars may be created over the surface of the glass substrate as shown in FIG. 12. Further, using these methods, circular microstructure pillars may be created having cross sectional dimensions smaller than the diameter of the spot area of the laser pulse used to create the microstructure. Further, the size of the cross section of the circular microstructure pillar may be varied by adjusting the radius of the radial pattern, the number of pulses in the radial pattern, the overlap of adjacent pulses in the radial pattern or various combinations thereof. In one embodiment, for a spot area having a diameter $d_{SA}$ on the surface of the glass substrate, the radius R of the first and second radial patterns may be selected such that the resulting circular microstructure pillar has a diameter of less than about $0.90*d_{SA}$, more preferably less than about $0.75*d_{SA}$, and most preferably less than about $0.50*d_{SA}$.

Further, using the method of applying multiple radial patterns of laser pulse spot areas, circular microstructure pillars may be formed having cross sectional dimensions larger than the diameter of the spot area of the laser pulse used to create the microstructure. This may be accomplished by selecting the radius R of the first and second patterns to be larger than the diameter $d_{SA}$ of the spot area of each beam pulse incident on the surface of the glass substrate.

It should also be understood that additional radial patterns of laser pulses may be applied to the surface of the glass substrate to alter the physical characteristics of the circular microstructure pillar, such as the surface wetting properties and the like, through ablation. Further, it should also be understood that the process of ablating glass along a radial pattern on the surface of a glass substrate may be repeated multiple times around different center points to create a regular pattern of circular glass microstructures 178 as shown in FIG. 12. Moreover, as shown in FIG. 12, an additional laser pulse may be directed onto the glass substrate at the center point 175 to create a cavity 180 at the center of each circular microstructure pillar 178.

In another embodiment, the radius R of the first radial pattern 170 may be selected such that the spot areas 172 of each laser pulse intersect or overlap at the center point 175. For example, in one embodiment, the radius R of the first radial pattern 170 may be less than the radius of each spot area in the first radial pattern. In this embodiment, a microstructure cavity centered on the center point 174 is formed instead of a circular microstructure pillar as glass at the center of the first radial pattern 170 is ablated from the surface of the glass substrate. The microstructure cavity will generally have a diameter greater than the diameter of the spot areas used to create the microstructure cavity. A second or subsequent radial pattern of overlapping spot areas centered on the center point 174 and rotationally offset from the first radial pattern may then be used to further refine the shape of the circular microstructure cavity.

Moreover, while specific reference has been made herein to directing laser pulses onto the glass substrate in first and second radial patterns 170, 176 to create a circular microstructure pillar or cavity in the glass substrate, it should be understood that circular glass microstructures may also be formed by using a continuous wave output of a laser source. For example, a continuous beam from a laser source may be directed onto the glass substrate using a laser system such as shown in FIG. 1. The continuous beam may be directed onto the surface of the glass substrate and traversed over the substrate in a radial pattern having a radius R thereby creating a glass microstructure at the center of the radial pattern. The overlapping spot areas 172 shown in FIG. 11A generally show the path along which the continuous beam may be traversed. Depending on the selected radius of the radial pattern, the glass microstructure may be a circular microstructure pillar or circular microstructure cavity. The continuous wave output of the laser source may be directed onto the surface in a second or subsequent radial pattern overlapping the first pattern to refine the shape and dimensions of the microstructure as discussed hereinabove.

It should now be understood that the system and methods shown and described herein may be used to form microstructures and, more specifically, patterns of microstructures on glass substrates. While specific examples shown and described herein have made reference to the use of the methods and systems of the present invention in conjunction with flat glass substrates, it should be understood that the systems and methods may be used to form microstructures on glass substrates having various other configurations such as glass rods, tubes, curved surfaces and the like. Moreover, is should now also be understood that the systems and methods described herein provide a faster and more cost effective alternative to photolithography and chemical etching for forming microstructures in glass substrates as no masking or application of other/additional chemicals is necessary.

Further, it should now be apparent that the microstructures formed in glass substrates using the systems and methods described herein may have potential for application in microfluidics, hyperhydrophobic surfaces, micro-cavity arrays, micro-lens systems, life science cells, micro-reactor mixing designs and the like. For example, the systems and methods described herein may be used to produce glass substrates with microstructures for use in conjunction with, for example, micro-fluidics systems, hyperhydrophobic surfaces, micro-cavity arrays, micro-lens systems, life science cells, and micro-reactor mixing designs. Accordingly, glass substrates made with or according to the systems and methods described herein may be used in biological applications, chemical applications, pharmaceutical applications, optical applications and the like.

It will be apparent to those skilled in the art that various modifications and variations may be made to the present invention without departing from the spirit and scope of the invention. Thus it is intended that the present invention cover the modifications and variations of this invention provided they come within the scope of the appended claims.

What is claimed is:

1. A method of forming microstructures on a glass substrate by laser ablation, the method comprising:
    directing a beam of a laser source onto a surface of the glass substrate and traversing the beam across the surface of the glass substrate such that a spot area of the beam forms a first pattern on the surface of the glass substrate as the beam is traversed across the glass substrate and glass is ablated from the glass substrate along the first pattern; and
    directing the beam of the laser source onto the surface of the glass substrate and traversing the beam across the surface of the glass substrate such that the spot area of the beam forms a second or subsequent pattern on the surface of the glass substrate as the beam traverses across the glass substrate wherein the second or subsequent pattern overlaps or intersects with the first pattern and glass is ablated from the glass substrate along the second or subsequent pattern thereby forming at least one microstructure on the glass substrate; and
    wherein the first pattern comprises a linear pattern of overlapping spot areas and the second or subsequent pattern comprises a linear pattern of overlapping spot areas substantially parallel with and overlapping the first pattern such that the at least one microstructure formed on the glass substrate is a plurality of tapered microstructure cavities wherein each tapered microstructure cavity in the plurality of tapered microstructure cavities has an opening having a diameter less than a diameter of a spot area of a laser pulse in the first pattern, a spot area of a laser pulse in a second pattern or both.

2. The method of claim 1 wherein the first pattern comprises a set of parallel lines and the second or subsequent pattern comprises a set of parallel lines and wherein the set of parallel lines of the first pattern are non-parallel with the set of parallel lines of the second or subsequent pattern such that the at least one microstructure formed on the glass substrate comprises a pattern of microstructure pillars formed on the glass substrate at the interstices between intersections of the set of parallel lines of the first pattern and the set of parallel lines of the second or subsequent pattern.

3. The method of claim 2 wherein the set of parallel lines of the first pattern is perpendicular to the set of parallel lines of the second or subsequent pattern.

4. The method of claim 2 wherein a pitch of the set of parallel lines of the first pattern and a pitch of set of parallel lines of the second or subsequent pattern are selected based on the desired dimensions of the microstructure pillars in the regular pattern of microstructure pillars.

5. The method of claim 1 wherein the first pattern comprises a radial pattern centered on a center point and the second or subsequent pattern comprises a radial pattern centered on the center point overlapping the first pattern such that the at least one microstructure is a circular microstructure pillar or a circular microstructure cavity centered on the center point.

6. The method of claim 1 wherein the beam of the laser source comprises a plurality of laser pulses and the first pattern comprises a first plurality of laser pulses wherein a spot area of each laser pulse in the first plurality of laser pulses overlaps a spot area of a preceding laser pulse, as spot area of a subsequent laser pulse or both; and
    wherein the second or subsequent pattern comprises a second or subsequent plurality of laser pulses wherein a spot area of each laser pulse in the second or subsequent pattern of laser pulses overlaps a spot area of a preceding laser pulse, a spot area of a subsequent laser pulse or both.

7. The method of claim 6 wherein the first pattern comprises a set of parallel lines with each line in the set of parallel lines comprising a row of overlapping spot areas and the second or subsequent pattern comprises a set of parallel lines with each line in the set of parallel lines comprising a row of overlapping spot areas and wherein the set of parallel lines of the first pattern are non-parallel with the set of parallel lines of the second or subsequent pattern such that the at least one microstructure formed on the glass substrate comprises a regular pattern of microstructure pillars formed on the glass substrate at the interstices between intersections of the set of parallel lines of the first pattern and the set of parallel lines of the second or subsequent pattern.

8. The method of claim 7 wherein the set of parallel lines of the first pattern is perpendicular to the set of parallel lines of the second or subsequent pattern.

9. The method of claim 7 wherein a pitch of the set of parallel lines of the first pattern and a pitch of set of parallel lines of the second or subsequent pattern are selected based on the desired dimensions of the microstructure pillars in the regular pattern of microstructure pillars.

10. The method of claim 6 wherein the first pattern comprises a radial pattern of overlapping spot areas centered on a center point such that a center of each spot area in the first radial pattern is equidistant from the center point and the second or subsequent pattern comprises a radial pattern of overlapping spot areas centered on the center point such that a center of each spot area in the second or subsequent radial pattern is equidistant from the center point and wherein the second or subsequent pattern is rotationally offset from the first pattern such that each spot area in the at least one second pattern is non-concentric with the spot areas in the first pattern thereby forming a circular microstructure pillar or a circular microstructure cavity on the glass substrate centered on the center point.

11. The method of claim 10 wherein a radius of the first radial pattern and a radius of the second or subsequent radial pattern are selected such that the microstructure is a circular microstructure pillar.

12. The method of claim 10 wherein a radius of the first radial pattern and a radius of the second or subsequent radial pattern are selected such that the microstructure is a circular microstructure cavity.

13. The method of claim 10 wherein the second or subsequent radial pattern is offset from the first radial pattern such that each spot area of each laser pulse in the second or subsequent radial pattern is non-concentric with a spot area of a laser pulse in the first radial pattern.

14. The method of claim 1 wherein the beam of the laser source is directed towards the surface of the glass substrate using a laser system comprising the laser source, a beam steering mechanism and a lens system wherein the beam from the laser source is directed into the beam steering mechanism which redirects the beam towards the surface of the glass substrate and into the lens system which focuses the beam on the surface of the glass substrate and wherein the beam steering mechanism is used in conjunction with the lens system to position the laser pulses on the surface of the glass substrate.

15. The method of claim 14 wherein the beam steering mechanism comprises at least one galvanometer mirror for redirecting the beam, the laser source comprises a $CO_2$ laser and the lens system comprises an F-theta lens.

16. A method for forming microstructure cavities in a glass substrate, the method comprising:
directing a first laser pulse onto the glass substrate thereby forming a first microstructure cavity having a tapered configuration in the glass substrate wherein the first laser pulse has a first spot area on the surface of the substrate;
directing a second laser pulse having a second spot area onto the glass substrate such that the second spot area overlaps the first spot area thereby forming a second microstructure cavity having a tapered configuration in the glass substrate wherein the second spot area is substantially the same as the first spot area on the surface of the substrate and wherein overlapping the second spot area over the first spot area ablates a portion of a sidewall disposed between the first microstructure cavity and the second microstructure cavity such that, after a portion of the sidewall is ablated, a diameter of an opening of the first cavity and a diameter of an opening of the second cavity are less than a diameter of the first spot area and/or a diameter of the second spot area.

17. The method of claim 16 further comprising directing a plurality of laser pulses onto the surface of the glass substrate such that a spot area of each laser pulse in the plurality of laser pulses overlaps the spot area of a preceding laser pulse, a subsequent laser pulse or both and wherein at least one spot area of at least one laser pulse overlaps at least one of the first spot area or the second spot area thereby forming a plurality of microstructure cavities having tapered configurations in the glass substrate and wherein the spot area of each laser pulse in the plurality of laser pulses is substantially the same as the first spot area, the second spot area or both on the surface of the substrate and wherein each microstructure cavity in the plurality of microstructure cavities has an opening having a diameter less than the diameter of the first spot area.

18. The method of claim 17 wherein the plurality of laser pulses are directed onto the glass substrate in parallel rows such that the spot area of each laser pulse in a row of laser pulses overlaps with the spot area of a preceding laser pulse in the row, a subsequent laser pulse in the row or both.

19. The method of claim 18 wherein adjacent parallel rows of laser pulses overlap and wherein the adjacent parallel rows of laser pulses are offset such that a center of each laser pulse in one parallel row is disposed between the centers of two consecutive laser pulses in an adjacent parallel row thereby forming a honeycomb pattern of microstructure cavities on the glass substrate.

* * * * *